Figure 1A:
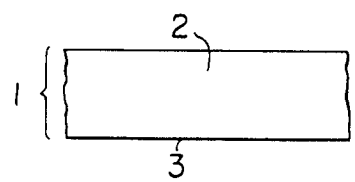

United States Patent [19]

Watanabe et al.

[11] Patent Number: 4,632,877
[45] Date of Patent: Dec. 30, 1986

[54] LAMINATED SAFETY GLASS

[75] Inventors: Hiroyuki Watanabe; Hiroshi Washita, both of Yokohama; Toshio Ichiki, Kawasaki, all of Japan

[73] Assignee: Asahi Glass Company Ltd., Tokyo, Japan

[21] Appl. No.: 676,296

[22] Filed: Nov. 29, 1984

[30] Foreign Application Priority Data

Nov. 29, 1983 [JP] Japan .................................. 58-223246

[51] Int. Cl.$^4$ ............................................ B32B 27/40
[52] U.S. Cl. .................................. 428/409; 156/331.1; 427/302; 428/420; 428/423.3; 428/425.6; 428/426
[58] Field of Search .................. 428/423.3, 425.6, 409, 428/426, 420; 427/302; 156/331.1

[56] References Cited

U.S. PATENT DOCUMENTS 4,584,245  4/1986  Watanabe et al. .................. 428/409

FOREIGN PATENT DOCUMENTS 1576394  10/1980  United Kingdom .

Primary Examiner—Edith Buffalow
Attorney, Agent, or Firm—Oblon, Fisher, Spivak, McClelland & Maier

[57] ABSTRACT

Transparent or translucent laminated safety glass having an at least two-layered structure, in which one outer layer is a relatively soft synthetic resin layer and the other outer layer is a hard substrate layer, characterized in that said relatively soft synthetic resin layer comprises: a surface layer of a reformed polyurethane type thermoplastic resin obtained by impregnating a polymerizable compound containing a polymerizable unsaturated group into a polyurethane type thermoplastic resin and polymerizing the compound; and an inner layer of a polyurethane type thermoplastic resin which is continuous or non-continuous with said surface layer.

15 Claims, 8 Drawing Figures

LAMINATED SAFETY GLASS

The present invention relates to laminated safety glass having a polyurethane type thermoplatic resin layer with a reformed surface, and, also to a method for manufacturing such laminated safety glass.

As the laminated safety glass, there has already been known a layered sheet composed of an inorganic glass sheet or a hard organic glass sheet and a relatively soft synthetic resin sheet. (Throughout this specification, a hard base member or substrate designates such an inorganic glass sheet or organic glass sheet, and the simple term of "glass" designates inorganic glass, unless specifically termed "organic glass"). A laminated safety glass with glass on both surfaces thereof such as, for instance, a laminated sheet having a three-layered structure of glass-polyvinyl butyral-glass has been widely used as safety glass for automobiles.

The synthetic resin layer interposed between the glass sheets is referred to as an intermediate film, and for this purpose, various synthetic resins such as polyvinyl butyral, polyurethane and the like are used or proposed to be used. On the other hand, among various types of laminated safety glass composed of glass and a synthetic resin, a laminated sheet with its synthetic resin layer exposed, e.g. a laminated sheet having glass on one side and a synthetic resin on the other side, such as glass-synthetic resin or glass-synthetic resin-glass-synthetic resin, has become attractive as a prospective material for safety glass for automobiles. This laminated safety glass is believed to be safer than the conventional laminated safety glass with both sides made of glass. For instance, if this laminated safety glass is used as the front window glass of an automobile with its synthetic resin surface facing inside, the synthetic resin surface is believed to protect an occupant such as a driver from being injured when he hits the front window glass and even when the glass is shattered, the synthetic resin layer is believed to prevent or minimize the scattering of the glass fragments into the inside of the automobile. Such a laminated safety glass having a glass surface on one side and a synthetic resin surface on the other side will be hereinafter referred to as "resin-laminated glass".

The resin-laminated glass is disclosed, for instance, in U.S. Pat. Nos. 3,881,043, 3,806,387, 3,979,548 and 3,808,077, U.K. Pat. Nos. 1,401,986 and 1,576,394 and German Pat. No. 2,240,580. As disclosed in these prior art references, the synthetic resin layer (hereinafter referred to as "laminated resin layer") is usually made of polyurethane. Further, it is well known to use polyurethane as an intermediate film in two-ply glass. The polyurethane includes so-called thermoplastic polyurethane and thermosetting polyurethane. The thermoplastic polyurethane is a linear polymer and is usually prepared by reacting a diol having a high molecular weight, a chain extender and a diisocyanate compound, whereas the thermosetting polyurethane is a cross-linked polymer and is prepared, for instance, by reacting a diol having a high molecular weight, a cross-linking agent and a diisocyanate compound. The laminated resin layer is required to be firmly bonded to glass. When a thermosetting polyurethane is used as the laminated resin layer, however, there is a problem that the thermosetting polyurethane can not firmly be bonded to glass. On the other hand, the thermoplastic polyurethane is capable of being firmly bonded to glass, but so long as it is used as a laminated resin layer in the resin-laminated glass, the other surface is exposed and the exposed surface has certain problems in its properties. Namely, the thermoplastic polyurethane does not have adequate weather resistance and is susceptible to an influence of a solvent. These problems are discussed in detail in U.K. Pat. No. 1,576,394.

The U.K. Patent discloses an invention whereby the above-mentioned problems are solved by providing a laminated resin layer comprising two polyurethane layers, namely the surface layer is made of a thermosetting polyurethane and the layer bonded to glass is made of a thermoplastic polyurethane. These two types of polyurethane are capable of being firmly bonded to each other. Accordingly, by this invention, it is possible to solve both problems relating to the bonding of the laminated resin layer to glass and the surface properties. However, this invention does not necessarily solve all the problems. Firstly, in this invention, it is necessary to prepare a sheet (which is referred to as a pre-formed polymeric sheet) comprising two different polyurethanes, thus requiring relatively complicated process steps. For instance, as described in the U.K. Patent, it is required to employ a method wherein a mixture of liquid monomers for one polyurethane is cast on a sheet of the other polyurethane to form a unitary structure, or a method in which one polyurethane is dissolved in a solvent and the solution thereby obtained is coated on the surface of the other polyurethane. The second problem resides in that the thermosetting polyurethane loses plasticity once it is hardened. First of all, there is a restriction in the process for forming a sheet or film of the thermosetting polyurethane (the casting method for hardening is usually the only process), and extrusion molding, press-molding or other methods suitable for forming a sheet or film can not usually be employed. Accordingly, it is difficult to obtain a smooth sheet or film having a uniform thickness. Further, in the case where the material has plasticity, it is usually possible to form a flat smooth surface by pressing it with a press having a flat surface, but in the case of the thermosetting polyurethane, it is impossible to form such a flat surface once the plasticity has been lost. Likewise, for this reason, the thermosetting polyurethane does not have adequate adhesiveness. Thirdly, the thermosetting polyurethane is inferior to the thermoplastic polyurethane in the physical properties required for the resin-laminated glass, such as penetration resistance or impact resistance.

In the above-mentioned prior art references, such various problems are not yet solved. Apart from the question of the surface properties, a thermoplastic resin, particularly a polyurethane thermoplastic resin, is believed to be most suitable for use as the laminated resin layer for the resin-laminated glass.

Previously, the present inventors succeeded in improving the surface properties of a polyurethane type thermoplastic resin by reforming the surface of such polyurethane type thermoplastic resin layer, on the basis of which they found out a method of producing resin-laminated glass of favorable properties without substantially using a thermosetting resin, for which they applied for patents (U.S. patent application Ser. No. 499,790 (1983) and European Patent Application Publication No. 98961). This surface reforming method is to introduce cross-linking groups into the surface of the polyurethane type thermoplastic resin, and subsequently to cross-link the cross-linking groups to one another. The polyurethane type thermoplastic resin having the cross-linkage in its surface part seemed to solve the above-mentioned problem of the surface properties thereof. However, further studies and experiments done by the present inventors thereafter led them to find out a new point of problem with this method. That is to say, in the practice of the above-described method, it is particularly preferred that the polyurethane type thermoplastic resin has a reactive group such as a carboxylic acid group. Without such a reactive group, it is difficult to introduce the cross-linking groups. On the other hand, it has been found that the carboxylic acid group as the reactive group is likely to lower the physical properties of the polyurethane type thermoplastic resin, and hence, the polyurethane type thermoplastic resin should not contain carboxylic acid groups except for its surface portion. As the polyurethane type thermoplastic resin, a polyurethane produced by use of a polyester diol is preferred from the aspect of its physical properties. However, the presence of carboxylic acid groups serves to decompose this ester bond. Accordingly, if the surface reformation can be done by use of a polyurethane type thermoplastic resin containing no substantial carboxylic acid groups, the problem ascribable to the above-mentioned carboxylic acid groups is believed not to occur.

As the results of various studies and experiments, the present inventors have found a method for reforming the polyurethane type thermoplastic resin which is capable of improving the surface properties of the polyurethane type thermoplastic resin irrespective of the presence or absence of carboxylic acid groups. This reforming method is one wherein a polymerizable compound containing at least one polymerizable unsaturated group is subjected to polymerization in the presence of a preformed polyurethane type thermoplastic resin to thereby form a polymer composition which has been rendered into the so-called "interpenetrating polymer network" (IPN). The reformed surface layer is present only on one side constituting an exposed surface of the laminated resin layer. Therefore, this reformed surface layer does not exist on the side of the laminated resin layer, which is in contact with the hard substrate. Moreover, from the standpoint of the physical properties required of the laminated resin layer as a whole, the existence of the polyurethane type thermoplastic resin in the laminated resin layer is indispensable.

It is therefore a primary object of the present invention to provide resin-laminated glass having a reformed surface structure.

It is another object of the present invention to provide an improved method for producing such resin-laminated glass.

According to one aspect of the present invention, there is provided transparent or translucent laminated safety glass having an at least two-layered structure, in which one outer layer is a relatively soft synthetic resin layer and the other outer layer is a hard substrate layer, characterized in that said relatively soft synthetic resin layer comprises: a surface layer of a reformed polyurethane type thermoplastic resin obtained by impregnating a polymerizable compound containing a polymerizable unsaturated group into a polyurethane type thermoplastic resin and polymerizing the compound; and an inner layer of a polyurethane type thermoplastic resin which is continuous or non-continuous with said surface layer.

According to another aspect of the present invention, there is provided a method for producing transparent or translucent laminated safety glass having an at least two-layered structure, in which one outer layer is a relatively soft synthetic resin layer and the other outer layer is a hard substrate layer, characterized in that said relatively soft synthetic resin layer is formed by impregnating a polymerizable compound containing a polymerizable unsaturated group into one surface part of a polyurethane type thermoplastic resin constituting the laminated safety glass, and polymerizing said compound.

According to still another aspect of the present invention, there is provided a method for producing transparent and translucent laminated safety glass having an at least two-layered structured, in which one outer layer is a relatively soft synthetic resin layer and the other outer layer is a hard substrate layer, characterized in that a polymerizable compound having a polymerizable unsaturated group is impregnated into one side of a sheet or film of a polyurethane type thermoplastic resin, and then polymerized, and that said sheet or film is thereafter laminated on said hard substrate layer so that the other side, which is not reformed, faces said substrate.

The foregoing objects, other objects as well as specific construction and resulting effect of the laminated safety glass according to the present invention will become more apparent from the following detailed description thereof.

Figure 1B:
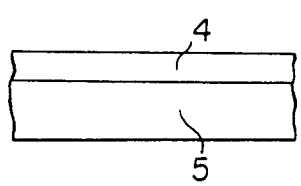
Figure 2A:
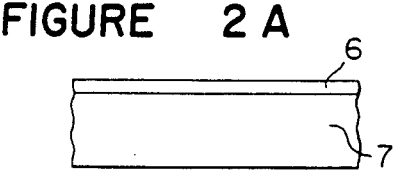
Figure 2B:
Figure 5:
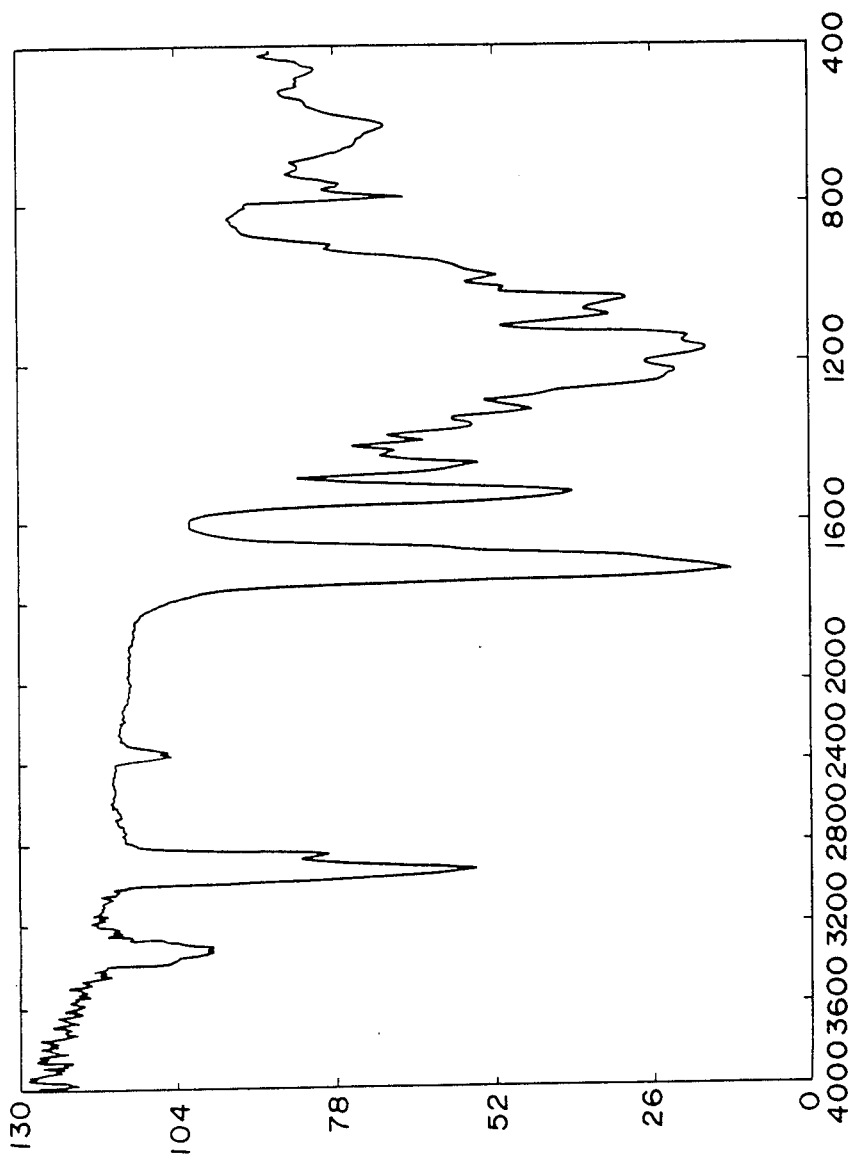
Figure 6:
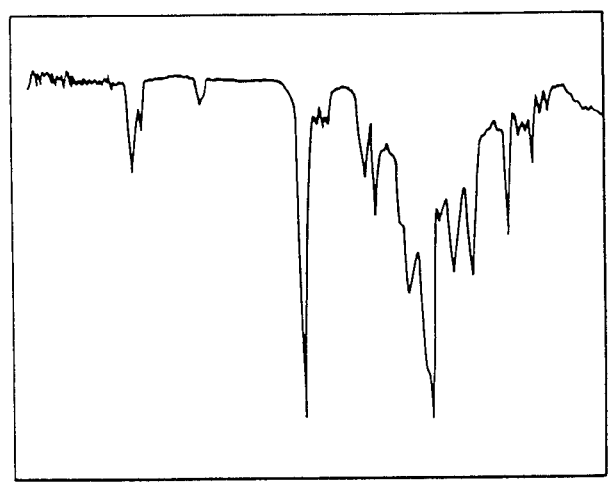
Figure 8:
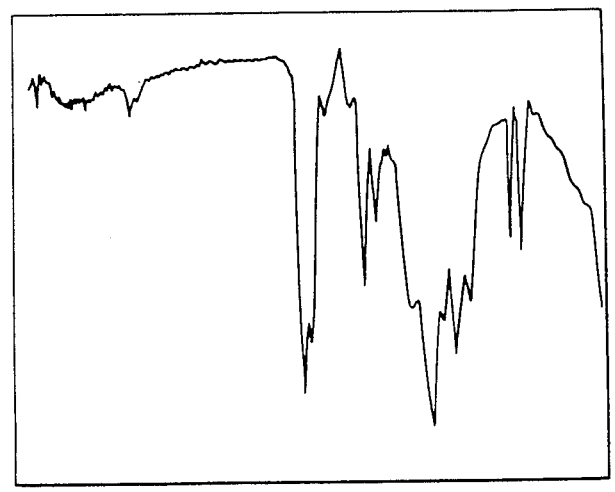
Figure 7:
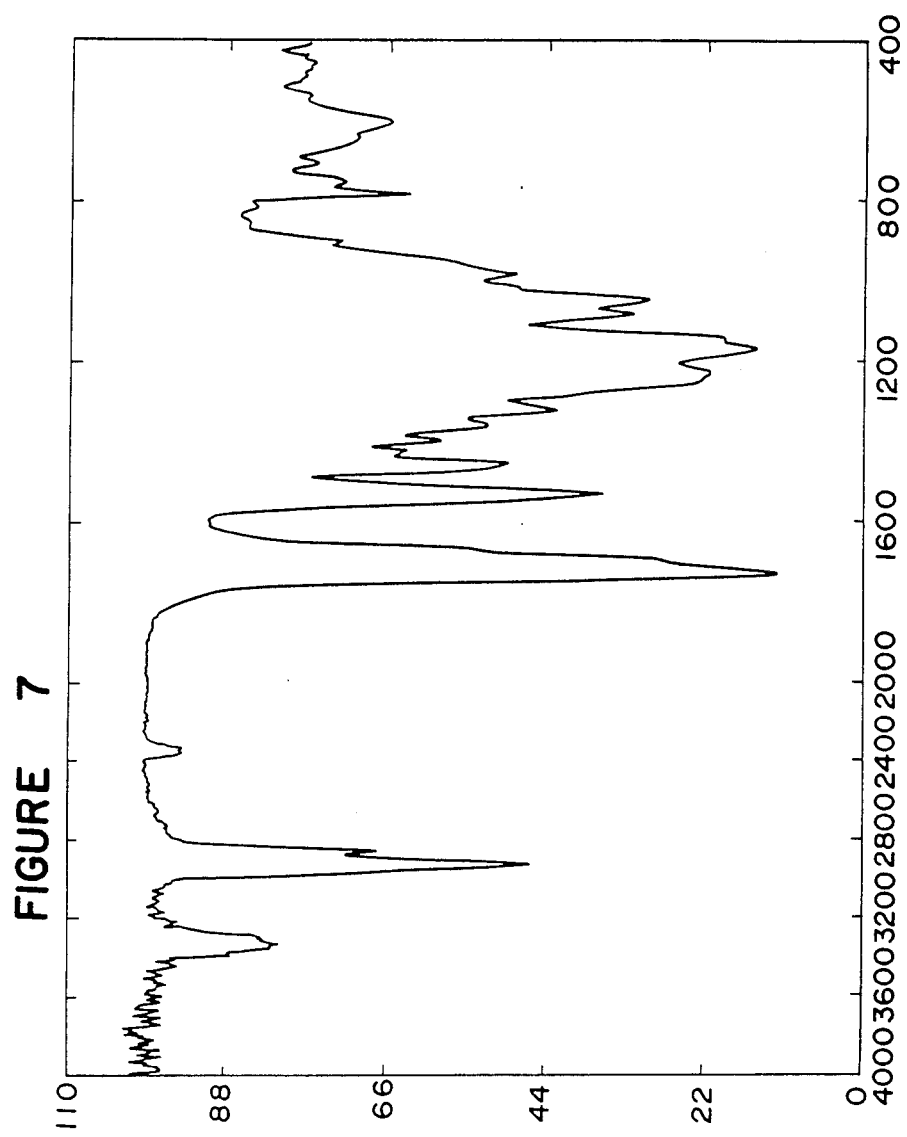

In the accompanying drawings,

FIGS. 1A to 2B are schematic cross-sectional views illustrating one example of a polyurethane type resin sheet to be used in the present invention, in which FIGS. 1A and 1B show a polyurethane type resin sheet comprising a reformed polyurethane type thermoplastic resin layer and another polyurethane type thermoplastic resin layer continuous with the reformed polyurethane type thermoplastic resin layer; FIG. 2A shows a polyurethane type resin sheet comprising a reformed polyurethane type thermoplastic resin layer and another polyurethane type thermoplastic resin layer non-continuous with the reformed polyurethane type thermoplastic resin layer; and FIG. 2B shows the reformed polyurethane type thermoplastic resin layer shown in FIG. 2A;

FIGS. 3A to 4B are schematic cross-sectional views illustrating examples of various constructions of the laminated safety glass according to the present invention, in which FIGS. 3A, 3B, 3C, 4A and 4B are respectively five different combinations of the component layers;

FIGS. 5, 6, and 7 are graphical representations of ATR spectrum which will be explained with reference to Example 1; and FIG. 8 is a graphical representation of ATR spectrum which will be explained with reference to Comparative Example 3.

Now, the present invention will be explained in detail. To begin with, explanations will be made as to a polyurethane type resin sheet or film for use in the present invention. This sheet or film corresponds to the pre-laminated member in the afore-described prior art, which is particularly suitable as a material for the resin-laminated glass. The polyurethane type resin sheet or film to be used for the present invention (hereinafter simply called "sheet", which should be understood to include "film") can be structurally classified into the following two basic types: the first type is a sheet, one surface side of which is reformed; and the second type is a sheet, both surfaces of which are reformed. In the latter type, at least two non-continuous layers are required to be present. Incidentally, the "continuous layer" is not meant for one which is later formed by lamination, etc., but is meant for a layer which is originally unitary. By the "non-continuous layer", it is meant that, even if two layers are made of one and the same material, they were separate before the reformation and unified after the reformation.

FIGS. 1A and 1B are the schematic cross-sectional views showing one example of the polyurethane type resin sheet having the continuous layer, in which FIG. 1A is a cross-section of a single sheet, one side of which has been reformed. Such surface reformation can be realized by, for example, impregnating a polymerizable compound into one side (2) of a polyurethane type thermoplastic resin sheet (1), and then subjecting the impregnated polymerizable compound to polymerization. The other side (3) is not reformed. Since the impregnated polymerizable compound penetrates into the polyurethane type thermoplastic resin sheet (1) to a certain depth from the surface (2) on one side, there can be formed a reformed polyurethane type thermoplastic resin layer of a certain thickness including the surface (2). This reformed polyurethane type thermoplastic resin layer is continuous with a non-reformed polyurethane type thermoplastic resin layer. The polyurethane type resin sheet shown in FIG. 1A will hereinafter be referred to as "sheet X". FIG. 1B is a schematic cross-section showing another example of the polyurethane type resin sheet having a continuous layer. This sheet is obtained by laminating the sheet X (4) and a polyurethane type thermoplastic resin sheet (5). This polyurethane type resin sheet can also be manufactured by laminating, in advance, two sheets of polyurethane type thermoplastic resin sheets, and then reforming one side thereof. It should be understood, however, that distinction between "continuation" and "non-continuation" is made in relation to the reformed layer and the non-reformed layer, hence the sheet shown in FIG. 1B is a kind of the polyurethane type resin sheet having the continuous layer. The polyurethane type resin sheet shown in FIG. 1B will hereinafter be referred to as "sheet Y".

FIG. 2A shows a schematic cross-sectional view of one example of the polyurethane type resin sheet having the non-continuous layer. This polyurethane type resin sheet will hereinafter be referred to as "sheet Z". The sheet Z is a laminated body having a two-layered structure made up of a polyurethane type resin sheet with both surfaces having been reformed (this sheet being hereinafter referred to "sheet z")(6) and a polyurethane type thermoplastic resin sheet (7), the two layers being non-continuous. FIG. 2B is a schematic cross-sectional view showing one example of the sheet z. Microscopically speaking, this sheet z may not be totally reformed into its interior as illustrated, or it may be totally reformed into its interior.

Figures 3A, 3B, 3C:
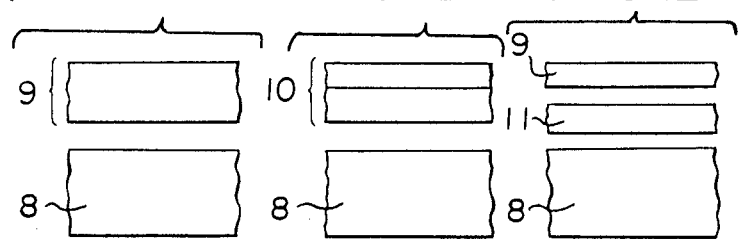

Now, explanations will be given as to the laminated safety glass according to the present invention. FIGS. 3A, 3B, 3C, and 4A, 4B are respectively schematic cross-sections illustrating various combinations of the resin-laminated glass in a basically two-layered structure composed of a single sheet of glass (9) and a laminated resin layer. FIG. 3A illustrates a combination of the above-mentioned sheet X (9) and the glass (8); FIG. 3B shows a combination of the sheet Y (10) and the glass (8); and FIG. 3C shows a combination of the sheet X (9) and the glass (8) with a polyurethane type thermoplastic resin sheet (11) being interposed between them. These three component layers may be simultaneously laminated, or the glass (8) and the polyurethane type thermoplastic resin sheet (11) may be laminated in advance, after which the sheet X (9) be laminated on the preformed layer. The lamination of the glass (8) on the preformed layer of the sheet X (9) and the polyurethane type thermoplastic resin sheet (11) belongs to one embodiment of the combination shown in FIG. 3B.

It is also possible to manufacture the laminated safety glass constructed with the combinations shown in FIGS. 3A to 3C and FIGS. 4A and 4B without use of the above-mentioned sheet X and sheet Y. For example, a resin-laminated glass having non-reformed surface, is first manufactured by laminating the glass (8) and the polyurethane type thermoplastic resin sheet (11), and then a polymerizable compound is impregnated into the non-reformed surface of the polyurethane type thermoplastic resin, followed by subjecting the compound to polymerization, whereby the intended resin-laminated glass having a reformed surface can be manufactured.

Figures 4A, 4B:
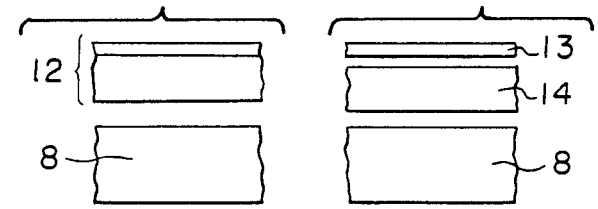

FIG. 4A illustrates a combination of the above-mentioned sheet Z (12) and the glass (8). FIG. 4B shows a combination, in which the above-mentioned polyurethane type resin sheet is not used. In more detail, this is a combination of the above-mentioned sheet z(13) and the glass (8) with a polyurethane type thermoplastic resin sheet (14) being interposed between them. These three component layers may be simultaneously laminated, or the glass (8) and the polyurethane type thermoplastic resin sheet (14) may be laminated in advance, and then the sheet z (13) is laminated on the preformed layer. As is the case with the embodiment shown in FIG. 3C above, the pre-lamination of the sheet z (13) and the polyurethane type thermoplastic resin sheet (14) belongs to one embodiment of the sheet Z.

The laminated resin layer according to the present invention, with its surface having been reformed, is, of course, excellent in its surface properties such as solvent-resistance, etc. in comparison with a laminated resin layer consisting of a polyurethane type thermoplastic resin alone. In addition to this, it exhibits unexpected properties. As one of the problems with the polyurethane type thermoplastic resin, there has been known a "blooming phenomenon". The blooming phenomenon is a phenomenon such that the surface of the polyurethane type thermoplastic resin becomes fogged or whitened with lapse of time. Microscopically speaking, it is a phenomenon such that very fine powder precipitates on the surface of the thermoplastic resin. In order to prevent the blooming phenomenon, various expedients have so far been required, such as optimization of the kind of the high molecular weight diol as the starting material for the polyurethane type thermoplastic resin. It has, however, been unexpectedly found that, by the above-mentioned surface reformation, the blooming phenomenon can be remarkably prevented irrespective of the kind of the polyurethane type thermoplastic resin or the kind of the starting material therefor.

While no particular restriction is imposed on the method of manufacturing the above-mentioned polyurethane type resin sheet X or z by reforming the surface of such polyurethane type thermoplastic resin sheet, it is still preferable to adopt a method, in which a polymerizable compound is impregnated into the surface of the preformed polyurethane type thermoplastic resin sheet, followed by subjecting the compound to polymerization. It is not really easy to form a thermosetting polyurethane layer having a uniform and flat and smooth surface by the well known method of using the preformed sheet having the thermosetting polyurethane layer, as already mentioned in the foregoing.

According to a more preferred embodiment of the present invention, a polymerizable compound is impregnated into the surface of a polyurethane type thermoplastic resin sheet which has previously been manufactured, and then the thus impregnated polymerizable compound is subjected to polymerization to thereby obtain the surface-reformed polyurethane type resin sheet. Since this method facilitates manufacturing of the polyurethane type thermoplastic resin sheet having a uniform thickness and a flat and smooth surface, the resulting polyurethane type resin sheet with its surface having been reformed also has a uniform thickness and is excellent in smoothness of its surface. Various methods are applicable to the manufacture of the sheet X shown in FIG. 1A, the sheet z shown in FIG. 2B, and so forth, by the impregnation method. For example, the sheet z can be readily manufactured by immersing a polyurethane type thermoplastic resin sheet into a solution of a polymerizable compound or such a polymerizable compound in liquid form, then pulling up the thermoplastic resin sheet to remove from its surface unimpregnated liquid of the polymerizable compound, and polymerizing the compound impregnated into the thermoplastic resin sheet. On the other hand, the sheet X can be manufactured by, for example, impregnating one side of a polyurethane type thermoplastic resin sheet with a polymerizable compound, followed by subjecting the compound to polymerization in the same manner as mentioned above. It can also be manufactured by first protecting one side of a polyurethane type thermoplastic resin sheet with a non-penetrating protective sheet so as to prevent a polymerizable compound from impregnating into that side, and then the thermoplastic resin sheet is treated in the same manner as in the case of the above-described sheet z. Further, it can also be manufactured by tentatively laminating two sheets of polyurethane type thermoplastic resin sheet, then subjecting it to the same treatment as mentioned above, and thereafter peeling off these two thermoplastic resin sheets. These methods can all be done continuously with high productivity.

It has been well known to form a hard coat layer by coating the surface of a hard plastic such as a polycarbonate sheet, etc. with a polymerizable compound or a composition containing such a polymerizable compound, and then curing the coated compound with heat, ultraviolet ray, and so forth. In the present invention, however, the formation of this hard coat layer is not suitable. The reason for this is that the polyurethane type thermoplastic resin is relatively soft, so that, even if the hard coat layer is formed on the surface of this relatively soft polyurethane type thermoplastic resin, the hard coat layer is destroyed very easily by shock, and other external force. Accordingly, in the present invention, the hard coat layer should not be formed to a substantial degree. That is to say, in the present invention, the surface of the polyurethane type thermoplastic resin does not contain substantially a polymer layer of the polymerizable compound having a uniform thickness. It has so far been said that the hard coat layer is required to have its thickness of at least one micron or so. In the present invention, even if there should be a case of including the polymer layer of the polymerizable compound having a uniform thickness, it is below 1 micron. Further, in the formation of the hard coat, no polymerizable compound is usually impregnated into the surface of the hard plastic. In contrast to this, such a polymerizable compound is impregnated relatively easily into the surface of the polyurethane type thermoplastic resin. In the present invention, various methods can be adopted as the method for reforming the polyurethane type thermoplastic resin without producing a uniform layer of a polymer of a polymerizable compound. For example, a polyurethane type thermoplastic resin sheet is immersed in a liquid containing therein a polymerizable compound, and then the sheet is pulled out of the liquid, followed by removing the polymerizable compound remaining on its surface by swashing. In the case of a volatile polymerizable compound, such a residual compound can be removed by air drying. It is, of course, possible to carry out the polymerization as soon as the sheet has been pulled up from the liquid, if the amount of the polymerizable compound remaining on its surface is small.

The characteristic of the surface reformation according to the prsent invention resides in that the polyurethane type thermoplastic resin is not required to be chemically bonded with the polymerizable compound beforehand, as it is possible to reform the abovementioned polyurethane type thermoplastic resin containing no carboxylic acid groups. Accordingly, as will be described later, the presence of a functional group such as an epoxy group, etc., in the polymerizable compound, capable of bonding with a functional group such as a carboxylic acid group, etc., in a polyurethane type thermoplastic resin, is not essential.

The polymerizable compound as used in the present invention is meant for a compound containing at least one polymerizable unsaturated group, particularly, at least one polymerizable $\alpha,\beta$-unsaturated double bond. This compound should preferably be in liquid at a normal temperature for the convenience in its processing, but it may also be a solid compound having a relatively low melting point, or be a gaseous compound. Such a polymerizable compound includes: aliphatic, alicyclic, aromatic, or other hydrocarbons having one or more unsaturated double bonds, or their derivatives such as halogen substituted compounds thereof; and aliphatic, alicyclic, aromatic or other alcohols, esters, ethers, ketones, carboxylic acids, amines, phenols, having one or more unsaturated double bonds, or their derivatives. More specifically, there are olefins, vinyl halides, acrylic acid and its esters, methacrylic acid and its esters, styrenes, acrylonitriles, allyl compounds, unsaturated polycarboxylic acid and its esters, and so forth. These polymerizable compounds may not contain, or preferably should not contain, functional groups such as epoxy groups or isocyanate groups, which can be readily bonded with the carboxylic acid groups, as mentioned above. The most preferred is a polymerizable compound which contains substantially no reactive group. When these polymerizable compounds are in a liquid state, they may be used directly for the impregnation. However, they should preferably be used as dissolved in a solvent. Preferably, the solvent should be hard to dissolve the polyurethane type thermoplastic resin.

The polymerizable compound may be styrene, an acrylic acid alkyl ester, a methacrylic acid alkyl ester, or other compounds containing one polymerizable unsaturated group. However, from the aspect of the effect of improvement in the surface properties of the polyurethane type thermoplastic resin, those polymerizable compounds having at least two polymerizable unsaturated groups (hereinafter referred to as "polyfunctional; compound") are more preferable. The polyfunctional compounds may be styrenes such as divinylbenzene or divinylstyrene, or other compounds. More preferably, however, they may be compounds having two or more allyl groups, or compounds having two or more acrylic acid residual groups or methacrylic acid residual groups, the latter being particularly preferable. Examples of the former are: diallyl phthalate, diallyl maleate, diallyl itaconate, diethylene glycol bisallyl carbonate, triallyl isocyanurate, triallyl melamine, and other polyallyl esters, polyallyl ethers, polyallyl amines, and so on.

A particularly preferable polyfunctional compound is a polyester of acrylic acid or methacrylic acid with a polyhydroxy compound. As such a polyhydroxy compound, there may be mentioned a polyhydric alcohol, a polyether polyol, a polyester polyol, and so on. As the polyhydric alcohol, there may be mentioned, for example, ethylene glycol, propylene glycol, 1,4-butanediol, 1,6-hexanediol, glycerin, trimethylolpropane, pentaerythritol, sorbitol, bisphenol A di(2-hydroxyethyl)ether, cyclohexanediol, and other polyhydric alcohols; diethylene glycol, triethylene glycol, dipropylene glycol, diglycerin, dipentaerythritol, and other polymerized substances of polyhydric alcohol. As the polyether polyols, there are those polyhydric alcohols and their polymerized substances, polyhydric phenol, alkanolamine, mono- or poly-amine, other polyether polyol to be obtained by adding epoxide, particularly alkylene oxide, to a polyhydric initiator, other open-ring polymers of cyclic ethers such as polyoxytetramethylene glycol, etc. As the polyester polyols, there are reaction products of a polyhydric alcohol with a polyhydric carboxylic acid, open-ring polymers of cyclic esters, and so forth. Particularly preferable polyhydroxy compounds are polyhydric alcohols having 2 to 6 hydroxyl groups and polymerized substances of polyhydric alcohols. Throughout this specification, both acrylic acid and methacrylic acid are called "(meth)acrylic acid". Specific examples of the particularly preferable polyfunctional compounds are as follows, though, of course, not limited to these alone.
Ethylene glycol di(meth)acrylate,
Diethylene glycol di(meth)acrylate,
1,4-butandiol di(meth)acrylate,
1,6-hexanediol di(meth)acrylate,
Propylene glycol di(meth)acrylate,
Neopentyl glycol di(meth)acrylate,
Glycerol tri(meth)acrylate,
Trimethylolpropane tri(meth)acrylate,
Pentaerythritol di(meth)acrylate,
Pentaerythritol tri(meth)acrylate,
Pentaerythritol tetra(meth)acrylate,
Dipentaerythritol tetra- (or penta-, or hexa-) (meth)acrylate,
Sorbitol tetra- (or penta-, or hexa-) (meth)acrylate,
Cyclohexanediol (meth)acrylate.

The polymerizable compound should preferably be polymerized by the thermal polymerizable reaction or the energy ray polymerization reaction, of which the polymerization with the ultraviolet ray is particularly preferable. For the thermal polymerization, it is preferable to use a polymerization initiator such as a radical generator, etc. In particular, a peroxide type or azo type polymerization initiator is preferable as the polymerization initiator. Specific examples of these polymerization initiators are: benzoyl peroxide, di-t-butyl peroxide, dicumyl peroxide, diisopropylperoxy dicarbonate, azobisisobutyronitrile, and so on. Use of a photo-initiator is preferred in the energy ray polymerization, particularly in the ultraviolet ray polymerization. As the energy ray other than the ultraviolet ray, use of an electron beam is preferable. It is also feasible to use those energy rays such as visible rays of a relatively short wavelength, X-ray, γ-ray, and so forth. As the source of the ultraviolet ray, use can be made of, for example, a high pressure mercury lamp, an ultraviolet ray fluorescent lamp, a Xenon lamp, a metal halide lamp, and others. As the above-mentioned photo-initiator, there may be used organic carbonyl type compounds, organic sulfur type compounds, pigments, azo type compounds, peroxide type compounds, and other photo-initiators. Two or more kinds of these photo-initiators may also be used in combination. Specific exampels of the photo-initiator are: benzophenone, methyl o-benzoylbenzoate, benzyl dimethyl ketal, 2,2-diethoxyacetophenone, benzoin, benzoinmethyl ether, benzoinethyl ether, benzoinisopropyl ether, benzoin(n-butyl) ether, benzoinisobutyl ether, 2-hydroxy-2-methylpropiophenone, 2-methylthioxanthone(2-methyl-9H-thioxanthene)-9-one, dibenzosuberone, benzoyl peroxide, and so forth, although these photo-initiators are not particularly limitative for the purpose of the present invention.

In the present invention, the laminated resin layer for the resin-laminated glass makes it essential to have the reformed surface layer of a soft polyurethane type thermoplastic resin rather than the hard substrate. This laminated resin layer needs to be transparent or translucent, although a sheet or film per se to be the material for the laminated resin layer may be non-transparent (e.g. with very fine irregularity on the surface) at the initial stage of its use, provided that it would be turned at the final stage of the processing to transparence to translucence. A transparent laminated resin layer is particularly preferable. This laminated resin layer may also be colored, or be partially non-transparent. While the outermost part of the laminated resin layer to be the exposed surface thereof should be the reformed polyurethane type thermoplastic resin, its inner part is not always limited to such reformed polyurethane type thermoplastic resin. However, even if there is a particular case of forming a thin adhesive layer, it is preferable that the laminated resin layer be composed of a polyurethane type thermoplastic resin in its substantially entire part, except for the reformed surface layer part.

In the present invention, the polyurethane type thermoplastic resin is a thermoplastic synthetic resin having a number of urethane groups. Besides urethane groups, this synthetic resin may also contain urea groups, allophanate groups, burette groups, and those radicals which are produced by the reaction of other active hydrogen-containing groups with isocyanate groups. It may also contain isocyanurate groups, carbodiimide groups, and those groups derived from isocyanate groups. Further, some of such synthetic resins contain not only ester groups, ether groups, carbonate groups or other groups which a high molecular weight polyol itself possesses, but also those groups derived from compounds such as chain extenders, cross-linking agents, and so on. The polyurethane type thermoplastic resin is a linear polymer which is basically obtained by the reaction of a high molecular weight diol, a chain extender, and an isocyanate compound. It may also contain a small amount of branched part. That is to say, it may be composed of a linear polymer in its most part, and a small amount of branched part to be obtained by use of a tri- or higher functional polyol, a cross-linking agent, or poyisocyanate together with the afore-mentioned bifunctional compound. Besides these three principal materials of high molecular weight diol, chain extender, and isocyanate compound, there may be used various auxiliary materials, depending on necessity, to obtain the polyurethane type thermoplastic resin. As an auxiliary material, a catalyst is usually required. As other auxiliary materials, cross-linking agents, coloring agents, photo-stabilizing agents, ultraviolet absorbing agents, anti-oxidation agents, burning retarders, and other additives may be used, depending on the particular purpose.

As the high molecular weight diol, there may be used a polyester diol, a polyether diol, a polyether ester diol, a polycarbonate diol, and other high molecular weight diols: in particular, a polyester diol obtained from a dihydric alcohol and a dibasic carboxylic acid type compound, or a polyester diol obtained by ring-opening and polymerization of a cyclic ester compound is preferable, for instance, poly(1,4 -butylene adipate), poly(ethylene adipate), poly(1,3 -butylene azelate), poly-($\epsilon$-caprolactone), and so on may be used. Further, in not less opportunity, there may preferably be used a polyether diol or a polycarbonate diol to be obtained by adding an epoxide such as an alkylene oxide or other cyclic ethers having four- or more member rings to water, a dihydric alcohol, a dihydric phenol, or other initiators. These high molecular weight diols may suitably be those low melting point compounds which are in a liquid state at a normal temperature, or which can be rendered liquid at the time of the reaction. Although there is no particular limitation to the molecular weight of such diols, it should preferably be in a range of from 350 to 8,000, or more particularly, from 400 to 4,000.

The chain extender is a divalent compound of a relatively low molecular weight: for example, a diol, a diamine, a divalent alkanolamine, and other compounds having two hydroxyl groups or amino groups. While no particular restriction is imposed on the molecular weight of the chain extender, it should preferably be in a range of from 200 or less, or more particularly, 150 or less. As the diol, there may be used a dihydric alcohol, a polyester diol, a polyether diol, a carboxylic acid group containing diol, and so forth. Particularly preferred is a dihydric alcohol having 2 to 6 carbon atoms. As the diamine, there may be used aliphatic, alicyclic, aromatic, and other diamines. As the alkanolamine, there may be used, for example, a N-alkyldiethanolamine, and other divalent alkanolamines. In the combination of these high molecular weight diol and chain extender, there may further be used, in combination, other divalent compound such as, for example, a diol having a molecular weight intermediate of the high molecular weight diol and the chain extender. For the high molecular weight diol and the chain extender, there may, of course, be used two or more kinds of compounds for each of them, in combination.

As the diisocyanate compound, there may be used aliphatic, alicyclic, aromatic, and other diisocyanate, and their modified substances. It is also possible to use two or more kinds of these substances in combination. In view of the fact that the isocyanate group directly bonded with the aromatic nucleus tends to apprehensively give yellow tinge to the resulting polyurethane, use of a diisocyanate not having such an isocyanate group, or such one as is usually called a "non-yellowing type" diisocyanate is preferable. Preferred examples of such a diisocyanate are hexamethylene diisocyanate, methylene bis(cyclohexyl isocyanate), cyclohexyl methane diisocyanate, isophorone diisocyanate, xylylene diisocyanate, and modified diisocyanates which are obtained by modification of the preceding diisocyanates with various compounds or treatments.

The polyurethane type thermoplastic resin can be manufactured by use of the above-mentioned materials through various methods such as the one-shot method, the prepolymer method, the quasi-prepolymer method, and others. Not only the polyurethane type thermoplastic resin can be directly made into sheet by these methods, but also it can be made into sheet from a solution, powder or granules of the resulted polyurethane. For example, it can be made into sheet by the casting method, the extrusion molding method, the injection molding method, the pressing method, and various other methods. It is particularly preferable that granules of polyurethane type thermoplastic resin obtained by these various methods are subjected to the extrusion molding to produce sheet, by use of which the resin-laminated glass is manufactured. By the way, the term "sheet" as used in the present invention is a concept which includes a "film" as already mentioned above. When both sheet and film are to be distinguished, the one having a thickness of 0.2 mm and more is called "sheet", and the one having a thickness less than 0.2 mm is called "film".

In the present invention, the laminated resin layer of the resin-laminated glass is essentially composed of a single layer or a multi-layered structure, the exposed surface of which consists of the reformed polyurethane type thermoplastic resin. While the main part of the laminated resin layer can be formed by directly pouring the raw material polyurethane type thermoplastic resin on the surface of the hard substrate, as will be described later, it is preferably manufactured by the laminating method. The sheet to be used for forming the laminated resin layer by the laminating method may be in a multi-layered structure. The side of the sheet or film in the multi-layered structure which constitutes the exposed surface should be the reformed polyurethane type thermoplastic resin, but the other side is not necessarily limited to the polyurethane type thermoplastic resin. When this multi-layered structure is laminated on the hard substrate, the side of the multi-layered structure to be in contact with the hard substrate should be firmly bonded with the hard substrate. It is also possible to laminate the single layer sheet or the multi-layered sheet on the hard substrate through a second sheet by press-bonding under heating. In this case, too, the entire laminated resin layer should be firmly bonded not only with the hard substrate but also with the contiguous layer. It is further possible to bond by use of an adhesive agent the hard substrate with the laminated resin layer or another layer contiguous to the laminated resin layer. It is preferable that, in the present invention, the laminated resin layer consists of a substantially single layer of the polyurethane type thermoplastic resin continuous with the reformed layer, or of a multi-layer of the polyurethane type thermoplastic resin including the reformed surface layer and the non-reformed inner layer. Moreover, as the laminating method, it is preferable to adopt a method, wherein the hard substrate and the polyurethane type thermoplastic resin are directly press-bonded together under heating. While there is no particular limitation to the thickness of the laminated resin layer as a whole, it should preferably be 0.2 mm or thicker, or more particularly in a range of from 0.4 mm to 10 mm.

As the method for manufacturing the resin-laminated glass, there has been known a mold-pouring method. In more detail, this manufacturing method comprises pouring liquid material of the polyurethane type thermoplastic resin between a single sheet of glass and a releasable mold material, usually a glass sheet treated with a mold-releasing agent, then curing the resin material, and removing the mold material, thereby obtaining the resin-laminated glass having a double-layer structure. The present invention is also applicable to a case where the surface of the polyurethane type thermoplastic resin of the resin-laminated glass obtained by this method is made the reformed surface. In more detail, the resin-laminated glass of the present invention can be constructed by laminating the above-mentioned sheet z on the surface of the polyurethane type thermoplastic resin of the resin-laminated glass obtained by this method, or by coating the above-mentioned polymerizable compound or its solution on the surface of the resin layer and polymerizing the polymerizable compound. However, the resin-laminated glass of the present invention having the above-mentioned construction should preferably be manufactured by the laminating method.

In the present invention, the hard substrate is made of a sheet material which is harder than the polyurethane type thermoplastic resin, such as, for example, inorganic glass sheet, polycarbonate, polymethyl methacrylate, or other organic glass sheets. The hard substrate may not only be of a single layer structure, but also be of a multi-layered structure, as mentioned in the foregoing. In the case of the multi-layered structure, the surface of the substrate to be bonded with the laminated resin layer by press-bonding under heating as well as the surface of the outermost layer thereof to be exposed outside is made of a hard material, although an intermediate layer between these two sheets of the hard material may be made up of a soft material such as a butyral resin, etc. In the case of the glass sheet, it can be strengthened by air cooling or with chemicals, etc. Also, the glass sheet may be colored, or be provided with a heat-ray reflecting film, or other thin films. In the case of the organic glass sheet, it may be subjected to a treatment such as elongation treatment, etc., or may be provided with a thin film such as a hard coat film. In addition, the organic glass sheet may be colored, or patterned, or may further have a partially non-transparent portion. Such a hard substrate should preferably be transparent or translucent as a whole, and should preferably be excellent in its optical property, in particular. The thickness of the glass sheet should preferably be 0.5 mm or thicker, or more preferably in a range of from 1 mm to 50 mm or so throughout the entire hard substrate. This hard substrate may not only be in a planar form, but also be shaped in various forms to be used for the front window or rear window of automobiles. Further, depending on the purpose, it may be formed into such a shape as of a lens having varied thickness. A particularly preferable hard substrate is a transparent or colored inorganic glass having a single layer structure or a multi-layered structure.

In the present invention, the reformed layer at the surface part of the polyurethane type thermoplastic resin, in the manufacture of the resin-laminated glass, may be formed after its manufacture, or the polyurethane type resin sheet of the present invention having the reformed layer may be laminated on the hard substrate to thereby manufacture the resin-laminated glass. As the laminating method, the heat press-bonding method is the most preferable, although such lamination may be done by use of an adhesive agent. The heat press-bonding is done by first laminating the sheet having the reformed surface layer on the hard substrate with the reformed surface being faced outside, then overlaying on this reformed surface a molding material with a flat and smooth surface to form a laminate assembly, and pressing this laminate assembly under heating. While this heat press-bonding can be performed in a single stage operation, it should preferably be done in a multi-stage operations, in which the laminate assembly is subjected to a preliminary press-bonding, followed by the main press-bonding. The preliminary press-bonding is done by placing the laminate assembly in a preliminary press-bonding envelope made of rubber, followed by deaerating the interior thereof. The main press-bonding is done by pressing the preliminary press-bonded body under heating in an autoclave. Such heat press-bonding can be effected by various known methods for manufacturing the laminated safety glass having an intermediate film between two sheets of glass. Usually, the molding material is removed at the final stage to obtain the resin-laminated glass. The molding material should preferably be of a glass sheet which has been subjected to the mold-releasing treatment, although it is not limited to this alone, but other materials such as rubber, plastic, metal, and so forth may equally be used.

The polyurethane type resin sheet according to the present invention is particularly suitable as the material for manufacturing the resin-laminated glass, but the resin material is not limited to this purpose, but it can be used for other purposes such as, for example, the polyurethane type thermoplastic resin requiring the optical property, e.g., formation of the surface reformed layer in a lens or a laminated lens.

Now, the present invention will be explained in reference to preferred Examples thereof for the purpose of enabling those persons skilled in the art to put the invention into practice. It should however be noted that the invention is not limited to these Examples alone, but any changes and modifications may be made within the ambit of the invention as recited in the appended claims.

REFERENCE EXAMPLES

Manufacture of polyurethane type thermoplastic resin:

(a) 15,000 g of poly(butylene adipate)diol having a hydroxyl group value of 54.4 was subjected to agitation, deaeration, and dehydration at a temperature of 110° C. under the vacuum of 3 mmHg. To this, 7,986 g of 4,4'-methylenebis(cyclohexyl isocyanate) and 1.5 g of dibutyltin dilaurate were added, and the batch was subjected to reaction at a temperature of 80° C. for 20 minutes in the current of nitrogen. Subsequently, 2,014 g of 1,4-butanediol was added to this reaction mixture and quickly agitated. With commencement of the reaction, heat generation occurred and a substantially uniform mixture was obtained. This liquid reaction mixture was charged in a dry vessel coated with a fluorine resin, which vessel was placed in a nitrogen-purged furnace at a temperature of 130° C. for 15 hours until the reaction substantially completed. The produced polymer was then cooled to a room temperature, followed by reducing its size to granules by means of a granulator. This granular polymer was formed into a sheet by an ordinary method through an extruder having its maximum cylinder temperature of 180° C., whereby a glass-like transparent sheet having a thickness of 0.5 mm was obtained.

(b) 15,000 g of poly(ethylene adipate)diol having a hydroxyl group value of 56.7, 8,077 g of 4,4'-methylenebis(cyclohexyl isocyanate), 1.5 g of dibutyltin dilaurate, and 1,993.5 g of 1,4-butanediol were used as the starting material to manufacture a glass-like transparent sheet having a thickness of 0.6 mm in the same method as in the above-mentioned Reference Example (a).

In the following (c) to (j), polyurethane type thermoplastic resin sheets were produced in the same manner as above.

| (c) Copolymerized ester of polycaprolactone and polybutylene adipate (hydroxyl group value of 55) | 1,500 g |
|---|---|
| 4'4-methylenebis(cyclohexyl isocyanate) | 969 g |
| 1,4-butanediol | 259 g |
| Dibutyltin dilaurate | 0.2 g |

With the above-mentioned composition, a sheet having a thickness of 0.6 mm was manufactured.

| (d) Coplymerized ester of polycaprolactone and polybutylene adipate (hydroxyl group value of 55) | 1,500 g |
|---|---|
| 4'4-methylenebis(cyclohexyl isocyanate) | 1,035 g |
| Ethylene glycol | 193 g |
| Dibutyltin dilaurate | 0.2 g |

With the above-mentioned composition, a sheet having a thickness of 0.6 mm was manufactured.

| (e) Diol of a mixed ester composed of ethylene glycol of adipic acid, diethylene glycol of adipic acid, and 1,4-butanediol (hydroxyl group value of 49) | 1,500 g |
|---|---|
| 4,4'-methylenebis(cyclohexyl isocyanate) | 834 g |
| Ethylene glycol | 129 g |
| Trimethylol propane | 38 g |
| Dibutyltin dilaurate | 0.15 g |

With the above-mentioned composition, a sheet having a thickness of 0.5 mm was manufactured.

| (f) Polypropylene glycol (hydroxyl group value of 56) | 750 g |
|---|---|
| Polycarprolactonediol (hydroxyl group value of 56) | 750 g |
| 4,4'-methylenebis(cyclohexyl isocyanate) | 1.169 g |
| 1,4-butanediol | 332 g |
| Dibutyltin dilaurate | 0.18 g |

With the above-mentioned composition, a sheet having a thickness of 0.6 mm was manufactured.

| (g) Diol consisting of poly(1,6-hexane carbonate) diol (hydroxyl group value of 56) | 1,500 g |
|---|---|
| 4,4'-methylenebis(cyclohexyl isocyanate) | 800 g |
| 1,4-butanediol | 200 g |
| Dibutyltin dilaurate | 0.15 g |

With the above-mentioned composition, a sheet having a thickness of 0.5 mm was manufactured.

| (h) Polyhexylene adipate diol (hydroxyl group value of 44) | 1,500 g |
|---|---|
| 4,4'-methylenebis(cyclohexyl isocyanate) | 789 g |
| 1,4-butanediol | 211 g |
| Dibutyltin dilaurate | 0.15 g |

With the above-mentioned composition, a sheet having a thickness of 0.6 mm was manufactured.

| (i) Polyhexylene adipate diol (hydroxyl group of 44) | 1,500 g |
|---|---|
| 4,4'-methylenebis(cyclohexyl isocyanate) | 789 g |
| 1,4-butanediol | 211 g |
| Dibutyltin dilaurate | 0.15 g |

With the above-mentioned composition, a sheet having a thickness of 0.6 mm was manufacture.

| (j) Polypropylene glycol (hydroxyl group value of 56) | 1,500 g |
|---|---|
| Isophorone diisocyanate | 736.8 g |
| 1,4-butanediol | 236.1 g |
| Dibutyltin dilaurate | 0.15 g |

With the above-mentioned composition, a sheet having a thickness of 0.6 mm was manufactured.

EXAMPLE 1

The resin sheet of 0.6 mm thick obtained from the Reference Example (a) was interposed betweeen glass sheets havin a size of 30 cm × 30 cm, and then the laminate was introduced into an appropriate autoclave. In this case, one of the glass sheets was uniformly coated in advance, on its one surface to be in contact with the resin film, with polydimethyl siloxane and heat-treated at 350° C., while the other glass sheet was uniformly coated, on its one surface to be in contact with the film, with γ-glyoydoxypropyl trimethoxy silane. The autoclave was initially evacuated to remove air existing between the glass sheet and the resin film, followed by heating the laminate in the vacuum at a temperature of 120° C., thereby carrying out the preliminary press-bonding. After opening, the autoclave was maintained for about 30 minutes at a temperature of 150° C. and under a pressure of 13 kg/cm² to perfectly fasten together the glass sheet and the resin film. After this, one of the glass sheets was removed from the laminate, thereby obtaining a resin-laminated glass of a double-layered structure composed of glass and plastic. The thus obtained resin-laminated glass was then immersed into a solution composed of 1,423 g of 1,4-butanediol diacrylate, 77 g of benzophenone, and 3,000 g of ethanol. After it was pulled out of the solution, the resin-laminated glass was dried in air, and then the laminate was subjected to irradiation of light by use of an air-cooling type high pressure mercury lamp of 80 w/cm and 1,000 w positioned at a distance of 7 cm, in a stream of nitrogen flowing at a rate of 1 m/min., while moving the resin-laminated glass Table 1 below indicates the surface properties of this resin-laminated glass.

This resin-laminated glass was excellent is its surface conditions in comparison with an untreated sheet, such that no blooming phenomenon was observed even after the lapse of several months. Further, FIG. 7 shows an ATR spectrum of the treated surface of this resin-laminated glass, FIG. 5 shows an ATR spectrum of the untreated sheet obtained in Reference Example (a), and FIG. 6 shows an ATR spectrum of a photo-cured product of 1,6-hexanediol diacrylate. From these spectral representations, it was found that the treated surface was not composed of a coating of acrylate, but a mixture of polyurethane type thermoplastic resin and a trace amount of polyacrylate. On the other hand, as is evident from the results of the surface property test given hereinafter, the surface layer is improved over a layer composed solely of polyurethane type thermoplastic resin, thus indicating that the interpenetrating polymer network (IPN) had been formed.

EXAMPLE 2

Using the sheet obtained in Reference Example (b), the resin-laminated glass was produced in the same manner as in Example 1 above. Onto this resin-laminated glass, a solution composed of 1,433 g of 1,6-hexanediol diacrylate, 68 g of benzophenone, and 3,000 g of ethanol was sprayed by use of an air gun, followed by drying the same in air. The thus treated resin-laminated glass was subjected to light irradiation under the same irradiating condition as in Example 1 above. No blooming phenomenon was observed with this resin-laminated glass. Table 1 below shows its surface properties.

EXAMPLE 3

Onto one surface of the sheet obtained in Reference Example (a), a solution composed of 1,433 g of 1,6-hexanediol diacrylate, 68 g of benzophenone, and 3,000 g of ethanol was sprayed by use of an air gun, followed by drying the same in air. The thus treated sheet was then subjected to the light irradiation from the sprayed surface side under the same irradiating condition as in Example 1 above. Subsequently, this sheet was laminated on the glass sheet in such a manner that its treated surface was in contact with one glass surface treated with polydimethyl siloxane, and that its untreated surface was in contact with the other glass surface treated with $\gamma$-glycydoxypropyltrimethoxysilane: thus, the resin-laminated glass was manufactured in the same manner as in Example 1 above. No blooming phenomenon was observed on the surface of this resin-laminated glass. Table 1 below indicates its surface properties.

EXAMPLE 4

Onto one surface of the sheet obtained in Reference Example (b), a solution composed of 1,423 g of 1,4-butanediol diacrylate, 77 g of benzophenone, and 3,000 g of ethanol was coated by use of an air doctor coater, after which it was dried in air. This sheet was then subjected to the light irradiation from the coated surface side thereof in the same manner as in Example 1 above. Subsequently, this sheet was laminated on the under-glass sheet to manufacture a resin-laminated glass in the same manner as in Example 3 above. No blooming phenomenon was observed on the surface of this resin-laminated glass. Table 1 below indicates its surface properties.

EXAMPLE 5

Using the sheet obtained in Reference Example (c), the resin-laminated glass was manufactured in the same manner as in Example 4 above. Table 1 below indicates its surface properties.

EXAMPLE 6

Using the sheet obtained in Reference Example (d), the resin-laminated glass was manufactured in the same manner as in Example 4 above. Table 1 below indicates its surface properties.

EXAMPLE 7

Using the sheet obtained in Reference Example (e), the resin-laminated glass was manufactured in the same manner as in Example 3 above. Table 1 below indicates its surface properties.

EXAMPLES 8 TO 11

Using the sheet obtained in Reference Examples (f) to (j), the resin-laminated glasses were manufactured in the same manner as in Example 4 above. Table 1 below indicates their surface properties.

COMPARATIVE EXAMPLE 1

In Example 1 above, the resin-laminated glass, before it was immersed in an ethanol solution, was subjected to a test. Its surface properties are shown in Table 1 below.

COMPARATIVE EXAMPLE 2

The sheet of 0.6 mm thick as obtained in Reference Example (b) was subjected to the heat press-bonding in the same manner as in Example 1 above, thereby manufacturing the resin-laminated glass of 30 cm×30 cm. The thus manufactured resin-laminated glass was immersed in a solution composed of 77 g of benzophenone and 300 g of ethanol. After it was pulled out of the solution, the resin-laminated glass was dried in air, and then subjected to the light irradiation under the same condition as in Example 1 above. The surface properties of this resin-laminated glass are shown in Table 1 below.

COMPARATIVE EXAMPLE 3

The sheet of 0.5 mm thick as obtained in Reference Example (a) was subjected to the heat press-bonding in the same manner as in Example 1 above, thereby manufacturing the resin-laminated glass of 30 cm×30 cm. Onto this resin-laminated glass, "UNIDIC 17-824" (an ultraviolet ray curing type hard coat, manufactured by Dainippon Ink & Chemicals, Incorporated, Japan) was sprayed by use of an air gun, followed by drying the same at 60° C. for 10 minutes. Subsequently, the resin-laminated glass was subjected to the light irradiation from a distance of 5 cm by use of an air-cooling type high pressure mercury lamp of 80 w/cm and 2,000 w. When the thus treated resin-laminated glass was pressed with a finger nail, it was observed that the rigid surface layer could not follow the soft layer underneath to result in cracks in the surface layer. Further, FIG. 8 indicates an ATR spectrum of the treated surface, from which no peak point was observed at all in the under-layered sheet of polyurethane type thermoplastic resin, thus indicating the presence of a single coating layer of UNIDIC 17-824.

REFERENCE EXAMPLE

Penetration-resistance test of the resin-laminated glass:

Each of the resin-laminated glasses obtained in Examples 1 through 11 was subjected to the anti-penetrating test as laid down in "JIS R3312". In neither case, a steel ball could pass through the resin-laminated glass. No scattering of glass was observed, but broken pieces of glass remained adhered to the resin sheet.

Table 1 below shows the surface properties of the resin-laminated glass obtained in each of the foregoing Examples.

Light transmission: according to "JIS R3212"

Taber's test: according to "JIS R3212" (increase in haze after repetition for 100 times)

Rubbing test: a condition after rubbing for 500 times under pressure of 330 g/cm² in the presence of a solvent (ethanol/methanol=10/1)

Surface condition (sense of touch): when the surface of the polyurethane layer was rubbed with a finger: "poor" indicates adhesiveness specific to the polyurethane type thermoplastic resin; and "good" indicates absence of such adhesiveness. Cracked surface, when pressed with a finger nail, was evaluated "poor", even if the surface gave a good sense of touch.

TABLE 1

| Example No. | | 1 | 2 | 3 | 4 | 5 | 6 | 7 | 8 | 9 | 10 | 11 | Comparative Example 1 | Comparative Example 2 |
|---|---|---|---|---|---|---|---|---|---|---|---|---|---|---|
| Light transmission (%) | JIS R3212 | 92 | 91 | 92 | 90 | 92 | 92 | 92 | 91 | 93 | 92 | 90 | 92 | 91 |
| Taber's wear (%) | " | 2.3 | 1.9 | 3.0 | 2.5 | 2.5 | 2.8 | 1.8 | 2.5 | 2.0 | 2.8 | 2.5 | 2.1 | 1.9 |
| Rubbing test | — | No change | ← | ← | ← | ← | ← | ← | ← | ← | ← | ← | Line scars appeared | ← |
| Surface condition (sense of touch) | — | Good | ← | ← | ← | ← | ← | ← | ← | ← | ← | ← | Poor | ← |

We claim:

1. Transparent or translucent laminated safety glass having an at least two-layered structure, in which one outer layer is a relatively soft synthetic resin layer and the other outer layer is a hard substrate layer, said relatively soft synthetic resin layer comprising: a surface layer of a reformed polyurethane type thermoplastic resin obtained by impregnating a polymerizable compound containing a polymerizable unsaturated group into a polyurethane type thermoplastic resin and polymerizing the compound; and an inner layer of a polyurethane type thermoplastic resin which is continuous or non-continuous with said surface layer.

2. The laminated safety glass according to claim 1, wherein said polymerizable compound is a polyfunctional acrylate or methacrylate.

3. The laminated safety glass according to claim 2, wherein said polyfunctional acrylate or methacrylate is a polyester of a polyhydric alcohol with acrylic acid or methacrylic acid.

4. The laminated safety glass according to claim 1, wherein said polymerizable compound is polymerized by ultraviolet radiation.

5. The laminated safety glass according to claim 1, wherein said polyurethane type thermoplastic resin is a polyurethane type thermoplastic resin containing no substantial free carboxylic acid groups.

6. A method for manufacturing transparent or translucent laminated safety glass having an at least two-layered structure, in which one outer layer is a relatively soft synthetic rsin layer and the other outer layer is a hard substrate layer, wherein said relatively soft synthetic resin layer is formed by impregnating a polymerizable compound containing a polymerizable unsaturated group into one surface of a polyurethane type thermoplastic resin constituting the laminated safety glass, and polymerizing said compound.

7. The method for manufacturing laminated safety glass according to claim 6, wherein said polymerizable compound is a polyfunctional acrylate or methacrylate.

8. The method for manufacturing laminated safety glass according to claim 7, wherein said polyfunctional acrylate or methacrylate is a polyester of a polyhydric alcohol with acrylic acid or methacrylic acid.

9. The method for manufacturing laminated safety glass according to claim 6, wherein said polymerizable compound is polymerized by ultraviolet radiation.

10. The method for manufacturing laminated safety glass according to claim 6, wherein polyurethane type thermoplastic resin is a polyurethane type thermoplastic resin containing no substantial free carboxylic acid group.

11. A method for manufacturing transparent or translucent laminated safety glass having an at least two-layered structure, in which one outer layer is a relatively soft synthetic resin layer and the other outer layer is a hard substrate layer, wherein a polymerizable compound having a polymerizable unsaturated group is impregnated into one side of a sheet or film of a polyurethane type thermoplastic resin, and then polymerized, and that said sheet or film is then laminated on said hard substrate layer so that the other side, which is not reformed, faces said substrate.

12. The method for manufacturing laminated safety glass according to claim 11, wherein said polymerizable compound is a polyfunctional acrylate or methacrylate.

13. The method for manufacturing laminated safety glass according to claim 12 wherein said polyfunctional acrylate or methacrylate is a polyester of a polyhydric alcohol with acrylic acid or methacrylic acid.

14. The method for manufacturing laminated safety glass according to claim 11, wherein said polymerizable compound is polymerized by ultraviolet radiation.

15. The method for manufacturing laminated saftey glass according to claim 11, wherein said polyurethane type thermoplastic resin is a polyurethane type thermoplastic resin containing no substantial free carboxylic acid group.

* * * * *